Figure 1:
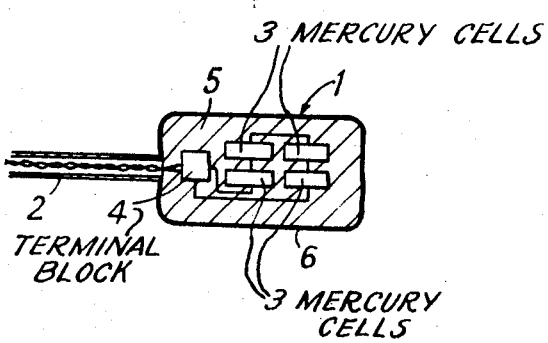

United States Patent
Kenny

[15] 3,690,325
[45] Sept. 12, 1972

[54] IMPLANTABLE ELECTRIC DEVICE

[72] Inventor: John Kenny, Welwyn Garden City, England

[73] Assignee: Devices Limited, Welwyn Garden City, England

[22] Filed: Nov. 2, 1970

[21] Appl. No.: 86,165

[30] Foreign Application Priority Data

Nov. 3, 1969 Great Britain..........53,889/69

[52] U.S. Cl. ............................128/419 R, 128/419 P
[51] Int. Cl. ..............................................A61n 1/36
[58] Field of Search..........128/419 B, 419 C, 419 E, 419 P, 128/419 R, 421, 422, 1 R, 260; 136/132, 133, 167, 169, 170, 177, 179, 180

[56] References Cited

UNITED STATES PATENTS

| 2,729,693 | 1/1956 | Waber | 136/132 |
| 3,198,195 | 8/1965 | Chardack | 128/419 P |
| 3,287,174 | 11/1966 | Hennigan et al. | 136/177 |
| 3,489,506 | 12/1969 | Auphan | 128/419 P |

Primary Examiner—William E. Kamm
Attorney—Wenderoth, Lind & Ponack

[57] ABSTRACT

An implantable electric device which has at least one electric cell, a casing of epoxy resin encapsulating the electric cell, and a thin barrier layer of metal covering the casing, which layer is permeable to gas and relatively impermeable to liquid.

9 Claims, 2 Drawing Figures

PATENTED SEP 12 1972  3,690,325

JOHN KENNY, Inventor

By *Wenderoth Lind & Ponack*

Attorneys

IMPLANTABLE ELECTRIC DEVICE

The invention relates to an electrically active device such as a cardiac pacer, such as is sold under the trademark Pacemaker by Electrodyne Co., Norwood, Mass., bladder stimulator or monitoring device which is implantable in the body. The power for such a device is derived from one or more electric cells, usually of the mercury type.

Usually, implantable devices are encapsulated in epoxy resin which may then be covered with a physiologically inert material such as silicone rubber. Experience has shown that such a unit is subject to battery failure in a shorter time than that which would be predicted from electric considerations only. It appears that the battery cells tend to deteriorate chemically. Experiments we have performed indicate that moisture from body fluids which, it is known, permeate the epoxy resin, may be responsible for the premature deterioration of the cells. Also, of course, moisture is harmful to the circuitry, particularly if it becomes mixed with sodium hydroxide from the cells. An object of the invention is to restrict the ingress of body fluids.

According to the invention there is provided an implantable electric device comprising one or more electric cells encapsulated in a body of epoxy resin or the like, the body being covered with a thin barrier layer of metal which layer is permeable to gas and relatively impermeable to liquid. The body with its barrier layer covering may be provided with an outer covering of silicone rubber or further encapsulating epoxy resin.

It will be seen that the invention does not seek to provide a hermetically sealed device. The reason for this is that in certain conditions we have found in hermetically sealed devices a substantial pressure build-up with use due to the evolution of gas by the cells. The porosity of the epoxy resin and barrier layer of the device according to the invention allows gas to escape and reduces the risk of explosion or splitting of the casing. This risk may be particularly high if the total volume of the body is only marginally larger than the volume of the cells. Usually, the cells are included in the same casing as the circuitry of the device. However, it is envisaged that perhaps the cells may be included in a separate battery pack connected to the circuitry by leads, the battery pack and the circuitry being separately encapsulated. In this event the battery pack will be regarded as the device of the present invention and will be the part to be provided with a barrier layer.

The barrier layer may of aluminum, which is preferably vapor deposited to a depth of about 4 to 6 microns. With aluminum an outer layer of epoxy resin or silicon rubber or the like should be provided for protection before clinical use.

Preferably the barrier layer is of palladium. A thickness of palladium of 0.001 of an inch or less is envisaged. The palladium layer may be vapor deposited, in which case it is found that a suitable thickness of palladium is 5 microns ($5 \times 10^{-6}$ meters). Such a palladium layer was found to reduce the moisture ingression by a factor of 8, while causing no significant reduction in the impedance to hydrogen flow.

Alternatively, the palladium layer may be deposited electrolessly after suitable preparation of the casing or by electroplating after similar preparation. Such layers are found to perform suitably at a thickness of 2 microns.

An incidental advantage of the barrier layer is that it provides shielding against electrically induced interference. An electrical connection may be made from the layer to a filter for the catheter connection.

Although the invention is particularly applicable to solving problems associated with mercury cells it is also applicable where other types of cells are used, perhaps even nuclear or isotope powered cells.

Figure 2:
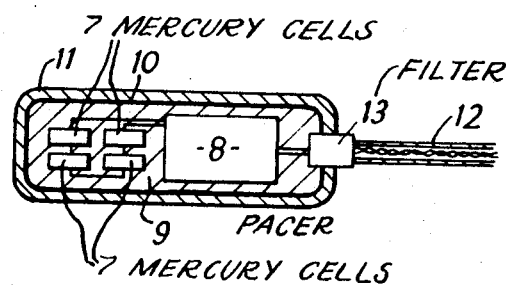

The invention will further be described with reference to the accompanying drawings, of which:

FIG. 1 is a cross-sectional elevation of a first device embodying the invention; and FIG. 2 is a cross-sectional elevation of a second device embodying the invention.

Referring to FIG. 1 there is shown a battery case for powering an implantable cardiac pacer. The pacemaker circuitry is included in a separate casing (not shown) from the battery case 1, to which it is connected by means of an insulated lead 2. The battery case includes four mercury cells 3 and a terminal block 4 encapsulated in a casing 5 of epoxy resin. The casing 5 is completely covered by a barrier layer 6 of palladium which is vapor deposited to a depth of 5 microns by the method of Example 1 to be described below.

Referring to FIG. 2 there is shown an alternative embodiment of the invention. Again the device is a cardiac pacer but in this embodiment the battery of mercury cells 7 is included with the pacer circuitry 8. The whole is encapsulated in a casing 9 of epoxy resin which is covered with a vapor deposited barrier layer 10 of aluminum 5 microns thick. The whole is then encapsulated by a further layer 11 of epoxy resin. The input signals to the pacer and the stimulating pulses therefrom are applied over a catheter lead 12 which is connected to the pacer through an interference rejecting filter 13. The metal body of the filter is regarded as circuit earth potential and is connected to the barrier layer 10 which thus constitutes an electrical shield for the circuit.

The invention will be more particularly described with reference to three examples of producing a suitable palladium layer. In each example the casing on which deposition was effected is epoxy resin in which is encapsulated a battery of four mercury cells and a terminal block. The casing was substantially rectilinear of dimensions 4.2 cm × 3.5 cm × 1.8 cm.

EXAMPLE I

VAPOR DEPOSITION

Samples were coated using a work accelerated electron beam gun in a vacuum of $10^{-9}$ torr, the samples being held eight inches from a vitreous carbon crucible containing the palladium. The maximum power employed was 200 watts, since higher wattages caused melting and blistering problems to the substrate. The times for coating varied between five and ten minutes, and these resulted in coating thicknesses on the order of $5\mu$. Adhesion between metal and resin was excellent.

EXAMPLE II

ELECTROLESS DEPOSITION a. Samples were prepared by cleaning, etching, sensitizing with stannous chloride and activating with palladium chloride.

b. The samples were plated electrolessly using the following solution and conditions:

| | | |
|---|---|---|
| Sodium hypophosphite | $(NaH_2 PO_2, H_2O)$ | 10 gpl |
| Palladium chloride | $(PdCl_2)$ | .2 gpl |
| Ammonium hydroxide | 28% $(NH_4OH)$ | 160 ml/l |
| Hydrochloric acid | 38% (HCL) | 4 ml/l |
| Ammonium chloride | $(NH_4Cl)$ | 27 gpl | pH 9.8 ± 0.2 temperature 40° C. No agitation. Plating rate $2\mu$/Hr.

Thicknesses of greater than approximately $4\mu$ were found to have microcracks, presumably due to stresses within the medium. However, $2\mu$ thicknesses functioned well for the purposes of the invention.

EXAMPLE III

ELECTROPLATING

Samples were prepared by the method (a) above. They were then electroplated in the following solution:

| | |
|---|---|
| Palladium chloride | 20 gpl |
| Hydrochloric acid 38% | 40 ml/l |

Temperature 40° C. current density 5 amps per sq. ft. with air agitation, and cathode rotation. As before, thicknesses of $2\mu$ were satisfactory.

I claim:

1. An implantable electric device comprising at least one electric cell, a casing of epoxy resin encapsulating the electric cell, and a thin barrier layer of metal covering the casing, which layer is permeable to gas and relatively impermeable to liquid.

2. An implantable electric device as claimed in claim 1 wherein the barrier layer is of palladium.

3. An implantable electric device as claimed in claim 2 wherein the palladium layer is vapor deposited.

4. An implantable electric device as claimed in claim 3 wherein the thickness of the palladium layer is approximately 5 microns.

5. An implantable electric device as claimed in claim 2 wherein the palladium layer is deposited electrolessly after suitable preparation of the casing.

6. An implantable electric device as claimed in claim 5 wherein the thickness of the palladium layer is approximately 2 microns.

7. An implantable electric device as claimed in claim 2 wherein the palladium layer is deposited by electroplating after suitable preparation of the casing.

8. An implantable electric device as claimed in claim 7 wherein the thickness of the palladium layer is approximately 2 microns.

9. An implantable electric device as claimed in claim 1 wherein the barrier layer is of aluminum and a further protective layer of silicone rubber or epoxy resin or the like is provided over the barrier layer.

* * * * *